(12) United States Patent
Shibata

(10) Patent No.: US 8,405,440 B2
(45) Date of Patent: Mar. 26, 2013

(54) SIGNAL TRANSMISSION DEVICE AND SIGNAL TRANSMISSION METHOD

(75) Inventor: Manabu Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 12/730,655

(22) Filed: Mar. 24, 2010

(65) Prior Publication Data

US 2010/0244917 A1     Sep. 30, 2010

(30) Foreign Application Priority Data

Mar. 27, 2009   (JP) .................................. 2009-078304

(51) Int. Cl.
*H03K 12/00*   (2006.01)
(52) U.S. Cl. ........................................ 327/184; 327/129
(58) Field of Classification Search .................... None
See application file for complete search history.

(56) References Cited

U.S. PATENT DOCUMENTS 6,323,692 B1 * 11/2001 Tsinker ........................... 327/12

FOREIGN PATENT DOCUMENTS

| JP | 8-125441 | 5/1996 |
| JP | 8-125703 | 5/1996 |
| JP | 2002-190841 | 7/2002 |

OTHER PUBLICATIONS

Office Action issued by the Japanese Patent Office on Oct. 23, 2012 in the corresponding Japanese patent application No. 2009-078304.

* cited by examiner

*Primary Examiner* — Cassandra Cox
(74) *Attorney, Agent, or Firm* — Staas & Halsey LLP

(57) ABSTRACT

A signal transmission device for transmitting a signal along a transmission path including a sinusoidal-signal transmitting unit configured to generate a sinusoidal signal that has a period the same as a period of a square-wave digital signal whose voltage level changes in correspondence with a logical value and that has a phase which differs based on change in the logical value of the square-wave digital signal, and configured to transmit the sinusoidal signal. The signal transmission device includes a sinusoidal-signal receiving unit configured to receive the sinusoidal signal, and configured to reproduce the square-wave digital signal from the sinusoidal signal based on change in the phase of the sinusoidal signal.

11 Claims, 13 Drawing Sheets

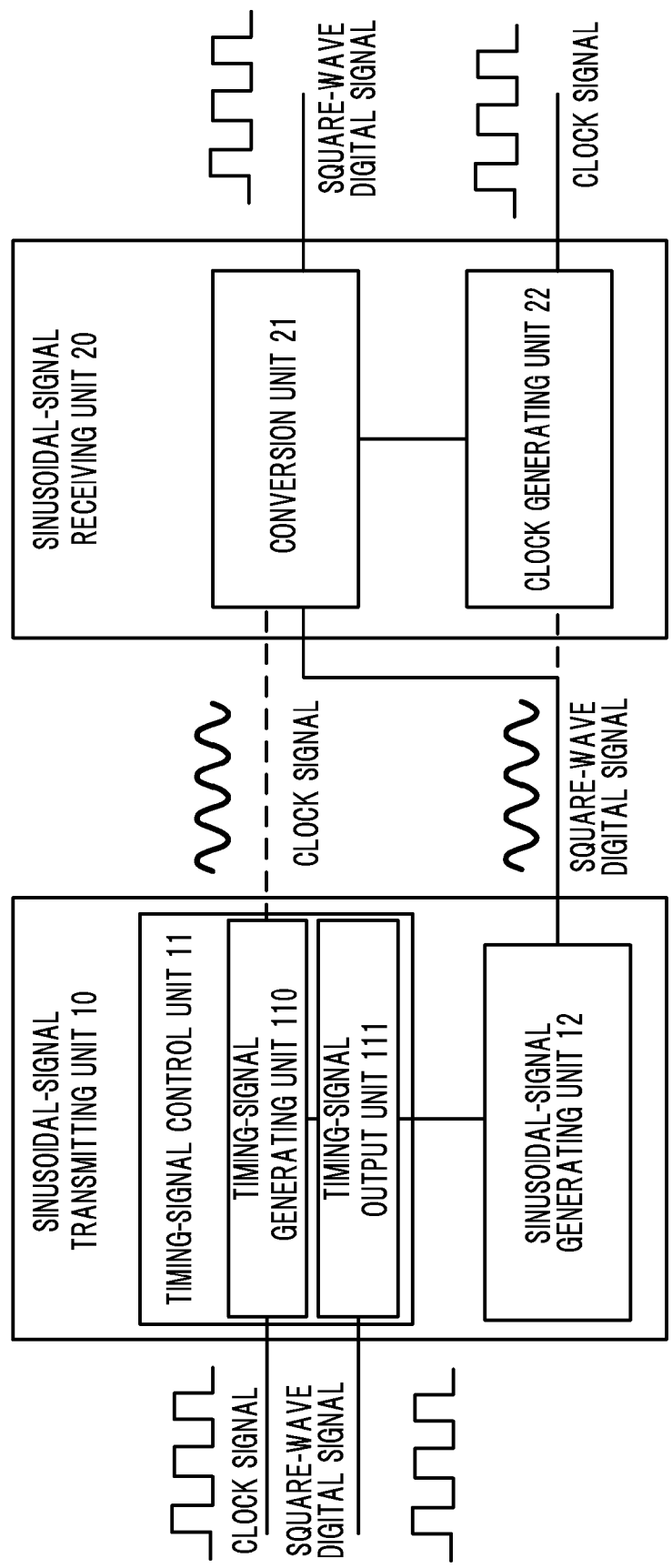

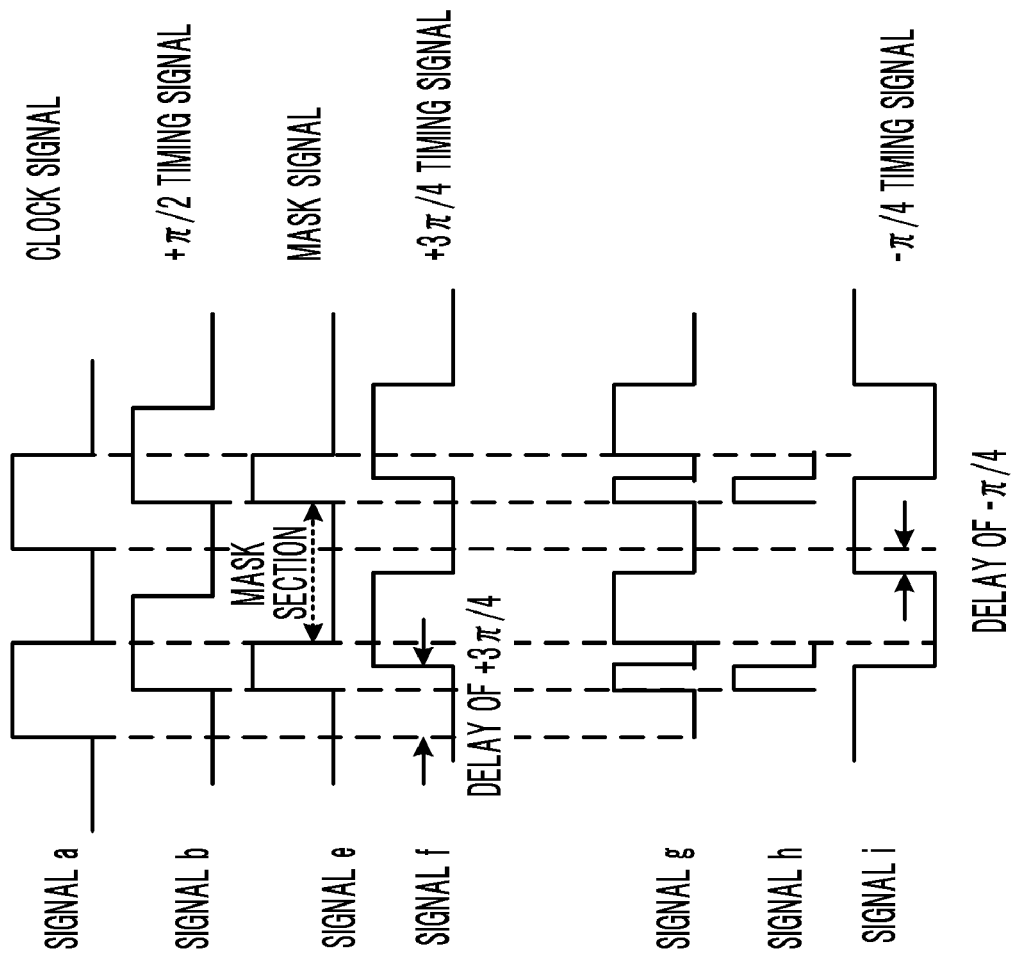

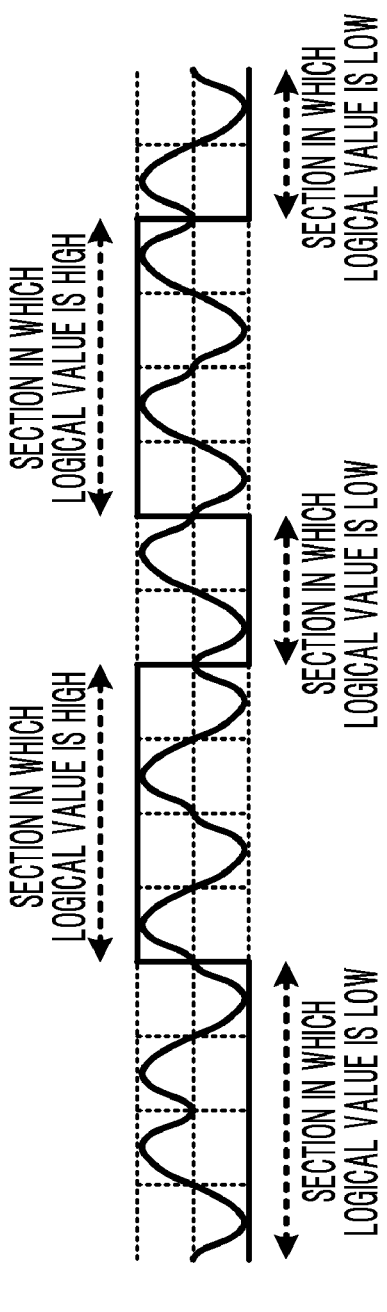
FIG. 12A
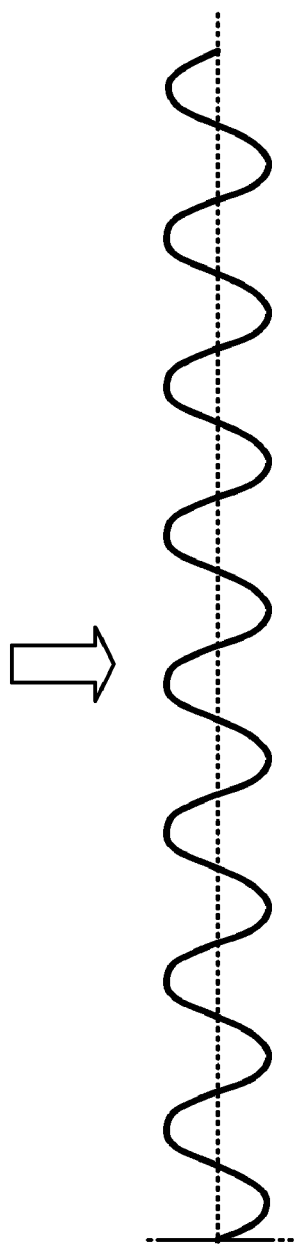
FIG. 12B
FIG. 12C

_US 8,405,440 B2_

SIGNAL TRANSMISSION DEVICE AND SIGNAL TRANSMISSION METHOD

CROSS-REFERENCE TO RELATED APPLICATIONS

This application is based upon and claims the benefit of priority of the prior Japanese Patent Application No. 2009-78304, filed on Mar. 27, 2009, the entire contents of which are incorporated herein by reference.

FIELD

Various embodiments described herein relate to a signal transmission device and a signal transmission method for transmitting a digital signal.

BACKGROUND

Various electronic apparatuses, such as radio base station apparatuses in radio communication systems, have a plurality of boards therein, and electronic devices such as large scale integrated circuits (LSIs) are implemented on the boards. In such an electronic apparatus, transmission of digital signals in each of the boards or between the boards is realized by serial transmission or parallel transmission of square wave signals using various forms. In a parallel transmission scheme, various types of circuit conditions associated with widening of the signal frequency band are relatively loose. However, because the number of pins of devices and the number of control signals are increased, it is difficult to satisfy requests for reduction in power consumption, reduction in size, and so forth. Examples of the various types of circuit conditions include conditions for filters for reducing high-frequency signals, conditions for termination, conditions for reflection, and so forth. On the other hand, in a serial transmission scheme, the number of signals is reduced, compared with the number of signals in the parallel transmission scheme. However, as compensation for reduction of the number of signals, because the transmission speed is increased, the signal frequency band is widened. Accordingly, in order to reduce high-frequency signals that occur, a complicated correction circuit is used. Furthermore, an impedance at a terminal of a transmission path is strictly controlled. For example, for high-frequency signals that occur because a signal passes along a transmission path, a circuit that corrects the amplitudes or delays of the high-frequency signals in advance on a transmission side is used. When the high-frequency signals are not completely removed, a correction circuit that performs correction in consideration of reflection of the high-frequency signals at the terminal is used concurrently with the above-mentioned circuit. Furthermore, in order to terminate a wide-band signal including a direct-current element, typically, a resister that is suitable for a characteristic impedance of each of the boards is used. A current that is determined based on the value of the register always flows. This leads to increase in current in the entire electronic apparatus having a plurality of signal lines in each of the boards and between the boards. One example of the value of the resistor that is suitable for a characteristic impedance of each of the boards is 50 Ω.

Furthermore, in SERializer/DESerializer (SerDes) that is a high-speed serial transmission scheme which is common at present, using an 8b/10b code or the like, continuous codes are prevented from being generated for a specified number or more of clocks, thereby reducing occurrence of high-frequency signals to some degree. However, in the SerDes, because a redundancy signal is added, the amount of data is reduced for the transmission speed.

Additionally, a scheme has been proposed, in which data is transmitted by adding information concerning the data to a carrier wave using phase shift keying (PSK) (for example, see Japanese Laid-Open Patent Publication No. 8-125703). However, in the scheme using a carrier wave, the frequency of the carrier wave does not match to the transmission speed, and points at which the phase is changed are not in synchronization with states of the carrier wave. Accordingly, a complicated demodulation circuit such as a demodulation circuit for radio signals is desired. Thus, it is difficult to reduce the size, cost, and power consumption of the electronic apparatus.

SUMMARY

A signal transmission device for transmitting a signal along a transmission path, the signal transmission device includes a sinusoidal-signal transmitting unit configured to generate a sinusoidal signal that has a period the same as a period of a square-wave digital signal whose voltage level changes in correspondence with a logical value and that has a phase which differs based on change in the logical value of the square-wave digital signal, and configured to transmit the sinusoidal signal. The signal transmission device includes a sinusoidal-signal receiving unit configured to receive the sinusoidal signal, and configured to reproduce the square-wave digital signal from the sinusoidal signal based on change in the phase of the sinusoidal signal.

The object and advantages of the various embodiments will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a configuration of a signal transmission device;

FIGS. 4A and 4B illustrate an example of a configuration of the timing-signal generating unit;

FIGS. 12A to 12C are timing diagrams of signals in the clock generating unit.

DESCRIPTION OF EMBODIMENTS

A signal transmission device according to the present embodiment converts a digital signal (a square-wave digital signal) whose voltage level changes in correspondence with a logical value (High or Low) and which has a square waveform into a sinusoidal signal having a period that is the same as the period of the square-wave digital signal. In addition, the signal transmission device changes the phase of the sinusoidal signal based on the logical value, and transmits the sinusoidal signal. Hereinafter, an example will be described, in which the signal transmission device generates two sinusoidal signals having different phases based on the logical value (High or Low) in units of one bit of the square-wave digital signal.

Figure 1A:
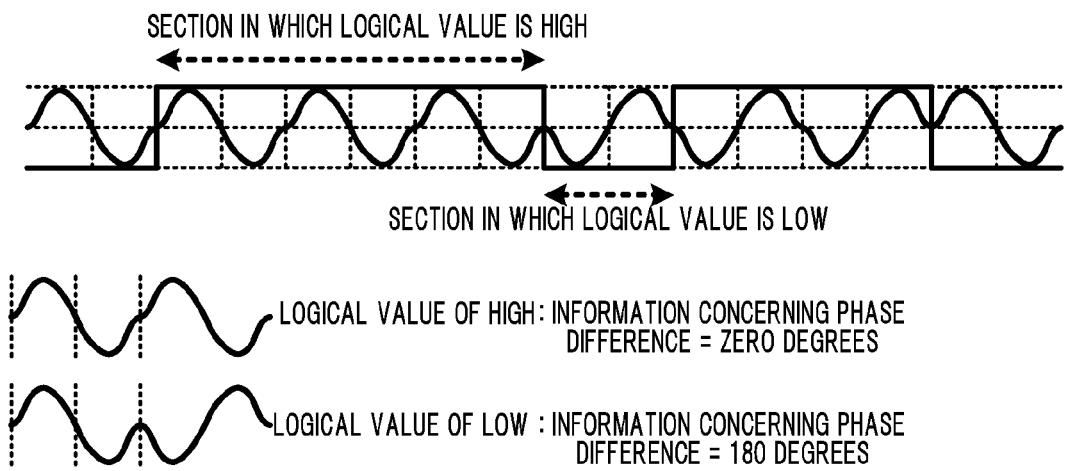
FIGS. 1A and 1B are diagrams for explaining changes in the phase of a sinusoidal signal based on a logical value.
Figure 1B:
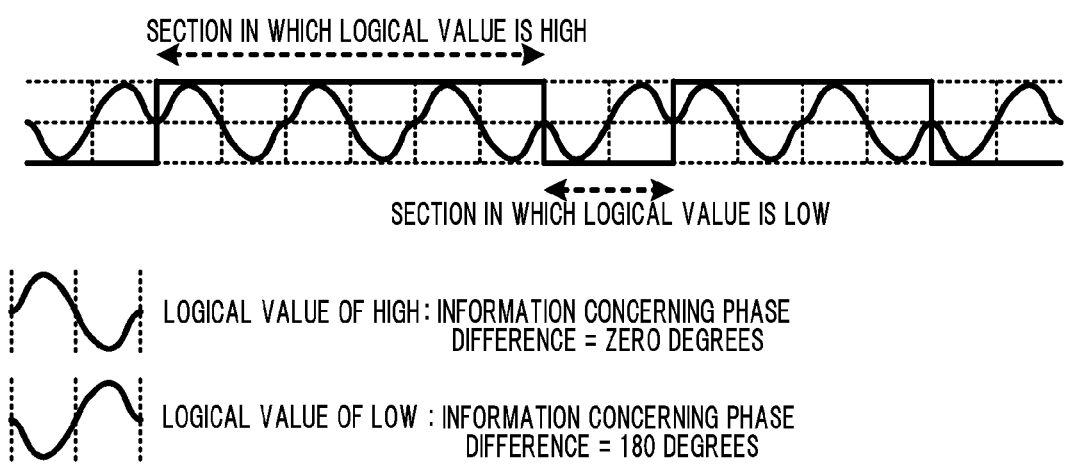

FIGS. 1A and 1B are diagrams for explaining changes in the phase of a sinusoidal signal based on the logical value. In each of FIGS. 1A and 1B, a square-wave digital signal whose voltage level changes in correspondence with the logical value (High or Low) is converted into a sinusoidal signal corresponding to one period in units of one bit. In FIG. 1A, the logical value is determined based on the phase difference between a sinusoidal signal for the previous bit and a sinusoidal signal for the current bit. In other words, in a case in which the phase difference between a sinusoidal signal for the previous bit and a sinusoidal signal for the current bit is zero degrees, the logical value is High. In a case in which the phase difference between a sinusoidal signal for the previous bit and a sinusoidal signal for the current bit is 180 degrees, the logical value is Low (relative phase). In other words, the logical value of the square-wave digital signal is converted using differential logic, and either of two sinusoidal signals having different phases is assigned to the logical value that has been obtained by conversion.

In FIG. 1B, the logical value is determined based on the phase of a sinusoidal signal corresponding to each bit. In other words, in a case in which the phase of a sinusoidal signal is zero degrees, the logical value is High. In a case in which the phase of a sinusoidal signal is 180 degrees, the logical value is Low (absolute phase). In other words, either of two sinusoidal signals having different phases is directly assigned to the logical value of the square-wave digital signal. In both of FIGS. 1A and 1B, the logical value may be Low in the former case, and the logical value may be High in the latter case.

FIG. 2 illustrates an example of a configuration of a signal transmission device according to an embodiment. The signal transmission device includes a sinusoidal-signal transmitting unit 10 and a sinusoidal-signal receiving unit 20. A square-wave digital signal is input to the sinusoidal-signal transmitting unit 10. The sinusoidal-signal transmitting unit 10 generates, based on the period of the square-wave digital signal, a sinusoidal signal having a period that is the same as the period of the square-wave digital signal. The sinusoidal-signal transmitting unit 10 outputs the sinusoidal signal to a transmission path. The sinusoidal-signal receiving unit 20 receives the sinusoidal signal that has been transmitted along the transmission path.

The sinusoidal-signal transmitting unit 10 includes a timing-signal control unit 11 and a sinusoidal-signal generating unit 12. The timing-signal control unit 11 generates specified timing signals based on the period of the square-wave digital signal. The sinusoidal-signal generating unit 12 generates a sinusoidal signal that has a period which is the same as the period of the square-wave digital signal, and that has a phase which differs based on change in the logical value of the square-wave digital signal. The timing-signal control unit 11 includes a timing-signal generating unit 110 and a timing-signal output unit 111. The timing-signal generating unit 110 generates timing signals, for example, having eight different phases that are obtained by shifting the period ($2\pi$) of a clock signal by multiples of $\pi/4$. The timing-signal output unit 111 outputs the generated timing signals to the sinusoidal-signal generating unit 12, and performs, based on the logical value (H/L) of the square-wave digital signal, control of outputting the timing signals. The sinusoidal-signal generating unit 12 generates voltages for individual phases, which correspond to the eight timing signals, in a standard waveform of a sine wave that is set in advance, thereby generating an appropriate sinusoidal signal.

The sinusoidal-signal receiving unit 20 includes a conversion unit 21 and a clock generating unit 22. The conversion unit 21 receives the sinusoidal signal, and reproduces the square-wave digital signal from the received sinusoidal signal. When no clock signal is transmitted from the sinusoidal-signal transmitting unit 10 side, the clock generating unit 22 generates a clock signal from the sinusoidal signal. When a clock signal is transmitted from the sinusoidal-signal transmitting unit 10 side, the clock generating unit 22 does not necessarily need to be provided.

FIGS. 3A and 3B and FIGS. 4A and 4B illustrate an example of a configuration of the timing-signal generating unit 110. A clock signal is input to the timing-signal generating unit 110, and the timing-signal generating unit 110 generates the timing signals having eight different phases that are obtained by shifting the phase of the clock signal by multiples of $\pi/4$. The clock signal that is input is considered as a reference timing signal (having no period shift). The timing-signal generating unit 110 generates a timing signal having a phase that is shifted by $-3\pi/4$, a timing signal having a phase that is shifted by $-\pi/2$, a timing signal having a phase that is shifted by $-\pi/4$, a timing signal having a phase that is shifted by $+\pi/4$, a timing signal having a phase that is shifted by $+\pi/2$, and a timing signal having a phase that is shifted by $+3\pi/4$ with respect to the reference timing signal (hereinafter, referred to as a $-3\pi/4$ timing signal, a $-\pi/2$ timing signal, a $-\pi/4$ timing signal, a $+\pi/4$ timing signal, a $+\pi/2$ timing signal, and a $+3\pi/4$ timing signal, respectively).

Figure 3A:
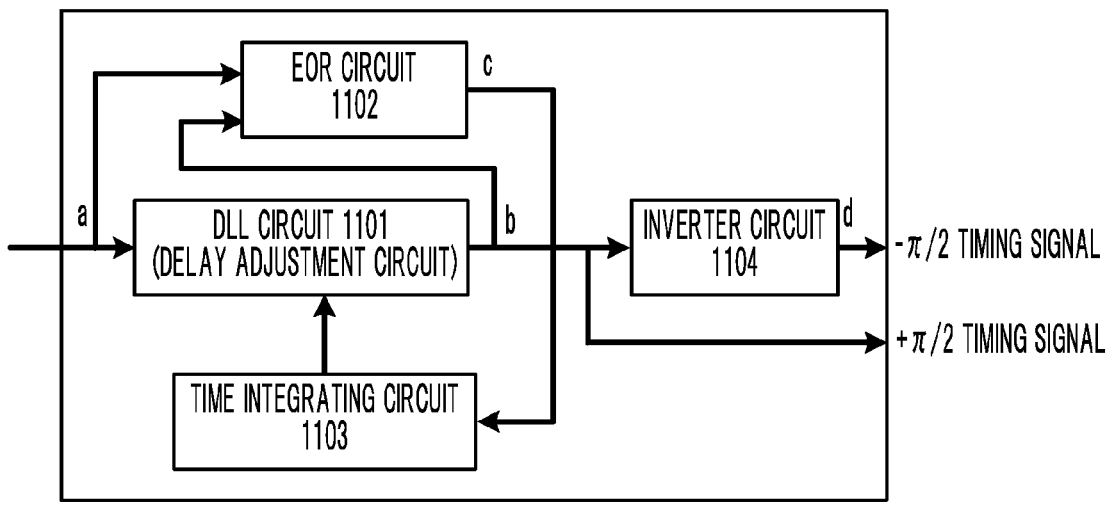
FIGS. 3A and 3B illustrate an example of a configuration of a timing-signal generating unit.
Figure 3B:
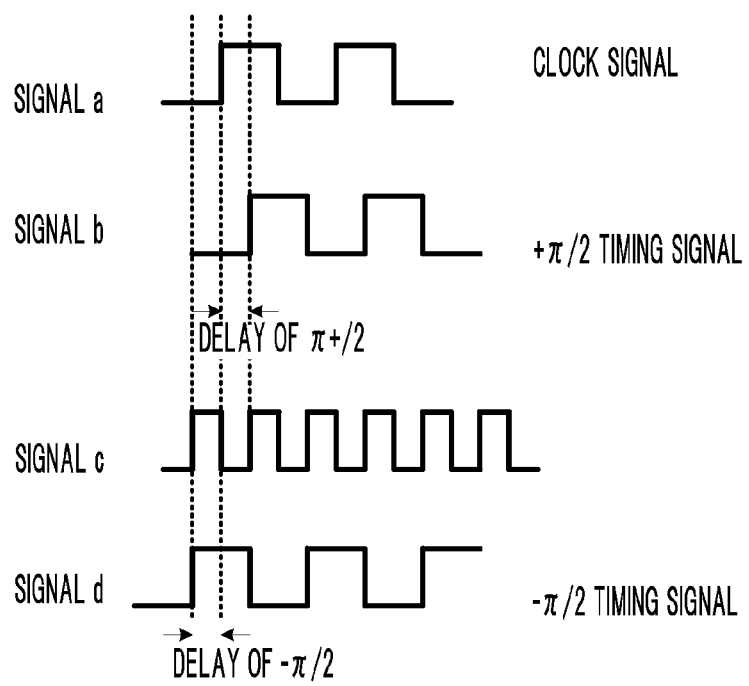

FIG. 3A illustrates an example of a circuit that generates the $-\pi/2$ timing signal and the $+\pi/2$ timing signal. FIG. 3B is a timing diagram of signals in the circuit. Referring to FIG. 3A, the clock signal (a signal illustrated in FIG. 3B) is input to a delay adjustment circuit 1101. The delay adjustment circuit 1101 outputs, based on a control voltage that is output from a time integrating circuit 1103, the $+\pi/2$ timing signal (a signal b illustrated in FIG. 3B) that is $+\pi/2$ behind the clock signal (the signal a).

The delay adjustment circuit 1101 is a delay locked loop (DLL) circuit. An exclusive OR (EOR) circuit 1102 takes, as inputs, the clock signal (the signal a) that is the reference timing signal and the signal (the signal b) that has been output from the DLL circuit 1101. The EOR circuit 1102 outputs, to the time integrating circuit 1103, a logical value (a signal C illustrated in FIG. 3B) that is determined using the inputs. When the signal that has been output from the DLL circuit 1101 is the $+\pi/2$ timing signal (the signal b), the level of the output (the control voltage) from the time integrating circuit 1103 becomes zero. When the phase of the signal that has been output from the DLL circuit 1101 is behind $+\pi/2$, the level of the control voltage becomes negative, and when the phase of the signal that has been output from the DLL circuit 1101 is ahead of $+\pi/2$, the level of the control voltage becomes positive, whereby feedback control is performed so that the signal will be output from the DLL circuit 1101 as the $+\pi/2$ timing signal.

Furthermore, the inverter circuit 1104 generates the $-\pi/2$ timing signal (a signal d illustrated in FIG. 3B) by inverting the $+\pi/2$ timing signal that has been supplied from the delay adjustment circuit 1101.

Figure 4A:
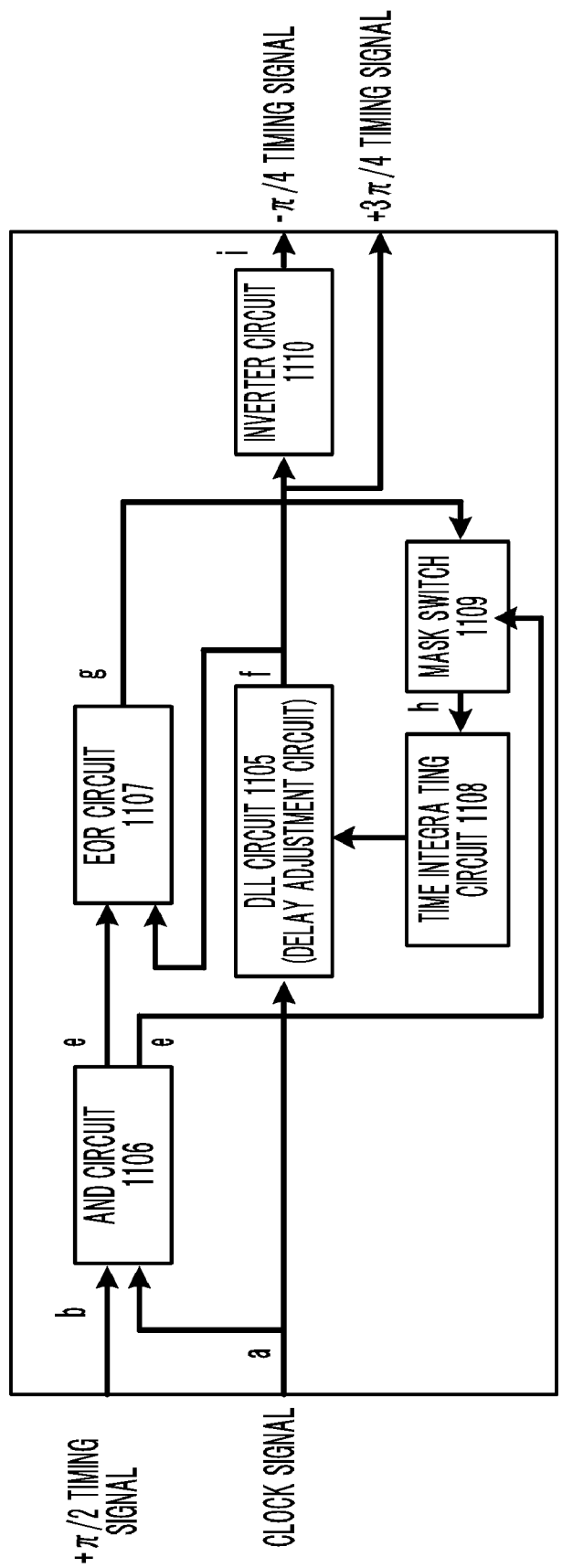

FIG. 4A illustrates an example of a circuit that generates the $-\pi/4$ timing signal and the $+3\pi/4$ timing signal. FIG. 4B is a timing diagram of signals in the circuit. The clock signal (the signal a) is input to a delay adjustment circuit 1105 that is a DLL circuit. The delay adjustment circuit 1105 outputs, based on a control voltage that is output from a time integrating circuit 1108, the $+3\pi/4$ timing signal (a signal f illustrated in FIG. 4B) that is $+3\pi/4$ behind the clock signal (the signal a).

An AND circuit 1106 takes, as inputs, the clock signal (the signal a) that is the reference timing signal and the $+\pi/2$ timing signal that has been generated by the circuit illustrated in FIG. 3A. The AND circuit 1106 outputs a logical value (a signal e illustrated in FIG. 4B) that is determined using the inputs. The signal (the signal e) that is output from the AND circuit 1106 is a signal for setting a mask section in which a time integration process performed by the time integrating circuit 1108 is stopped, and is supplied to a mask switch 1109.

An EOR circuit 1107 takes, as inputs, the signal (the signal e) that has been output from the AND circuit 1106 and the signal (the signal f) that has been output from the DLL circuit 1105. The EOR circuit 1107 outputs a logical value (a signal g illustrated in FIG. 4B) that is determined using the inputs via the mask switch 1109 to the time integrating circuit 1108. The mask switch 1109 does not output, to the time integrating circuit 1108 during the mask section (while the signal e is having a logical value of L), the signal (the signal g) that has been output from the EOR circuit 1107. Only when the mask section is not set (when the signal e has a logical value of H), the mask switch 1109 outputs, to the time integrating circuit 1108, the signal (the signal g) that has been output from the EOR circuit 1107. A signal h illustrated in FIG. 4B indicates a signal that is output from the mask switch 1109.

When the signal that has been output from the DLL circuit 1105 is the $+3\pi/4$ timing signal (the signal f), the level of the output (the control voltage) from the time integrating circuit 1108 becomes zero. When the phase of the signal that has been output from the DLL circuit 1105 is behind $+3\pi/4$, the level of the control voltage becomes negative, and when the phase of the signal that has been output from the DLL circuit 1105 is ahead of $+3\pi/4$, the level of the control voltage becomes positive, whereby feedback control is performed so that the signal will be output from the DLL circuit 1108 as the $+3\pi/4$ timing signal.

Furthermore, the inverter circuit 1110 generates the $-\pi/4$ timing signal (a signal i illustrated in FIG. 4B) by inverting the $+3\pi/4$ timing signal that has been supplied from the delay adjustment circuit 1105.

Note that the $+\pi/4$ timing signal and the $-3\pi/4$ timing signal are generated by inputting the $-\pi/2$ timing signal instead of the $+\pi/2$ timing signal to the AND circuit 1106 in the circuit illustrated in FIG. 4A. Furthermore, the $-\pi$ timing signal is generated by inverting the clock signal. In this manner, the eight timing signals for dividing one period into eight equal periods are generated.

The sinusoidal-signal generating unit 12 generates, at individual timings that are controlled using the above-described eight timing signals, voltage values of the sine wave for the corresponding phases, thereby generating the approximately sinusoidal signal.

Figure 5:
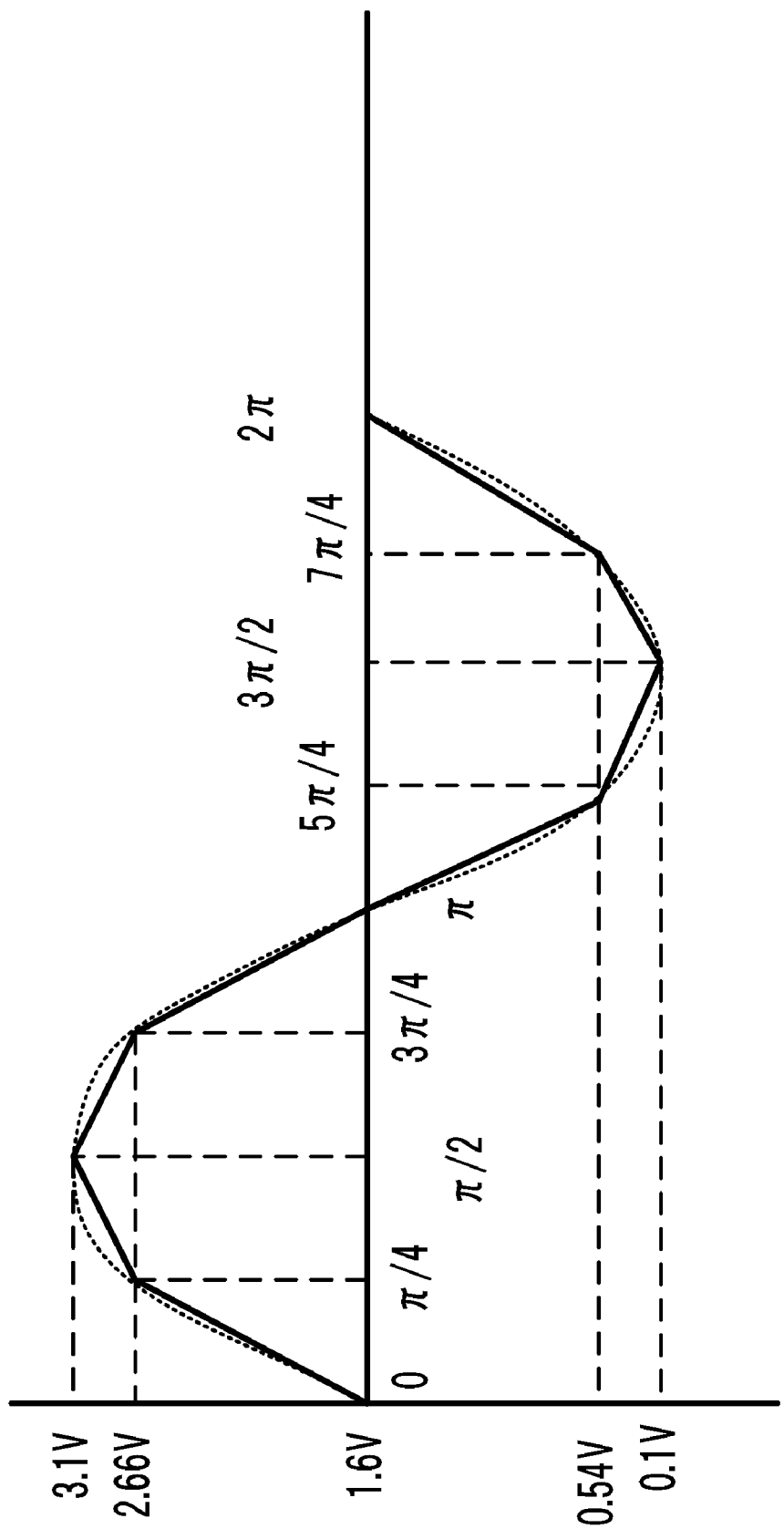
FIG. 5 is a diagram of an approximately sinusoidal signal that is generated by a sinusoidal-signal generating unit.

FIG. 5 is a diagram illustrating the approximately sinusoidal signal that is generated by the sinusoidal-signal generating unit 12. For example, the maximum voltage of the sinusoidal signal is set to 3.1 V, and the minimum voltage is set to 0.1 V. In this case, a center voltage of 1.6 V is generated at a timing corresponding to the phase of zero (at a reference timing). A voltage of about 2.66 V is generated at a timing corresponding to the phase of $+\pi/4$. The maximum voltage of 3.1 V is generated at a timing corresponding to the phase of $+\pi/2$. The voltage of about 2.66 V is generated at a timing corresponding to the phase of $+3\pi/4$. The center voltage of 1.6 V is generated at a timing corresponding to the phase of $+\pi$. A voltage of about 0.54 V is generated at a timing corresponding to the phase of $+5\pi/4$ ($-3\pi/4$). The minimum voltage of 0.1 V is generated at a timing corresponding to the phase of $+3\pi/2$ ($-\pi/2$). The voltage of about 0.54 V is generated at a timing corresponding to the phase of $+7\pi/4$ ($-\pi/4$). In this manner, a sinusoidal signal having a waveform that is illustrated using the dotted line in FIG. 5 may be generated. In other words, in an example illustrated in FIG. 5, the timings at which the five voltage values 0.1 V, 0.54 V, 1.6 V, 2.66 V, and 3.1 V are generated controlled using the above-described eight timing signals, whereby the approximate sinusoidal signal may be generated.

Figure 6:
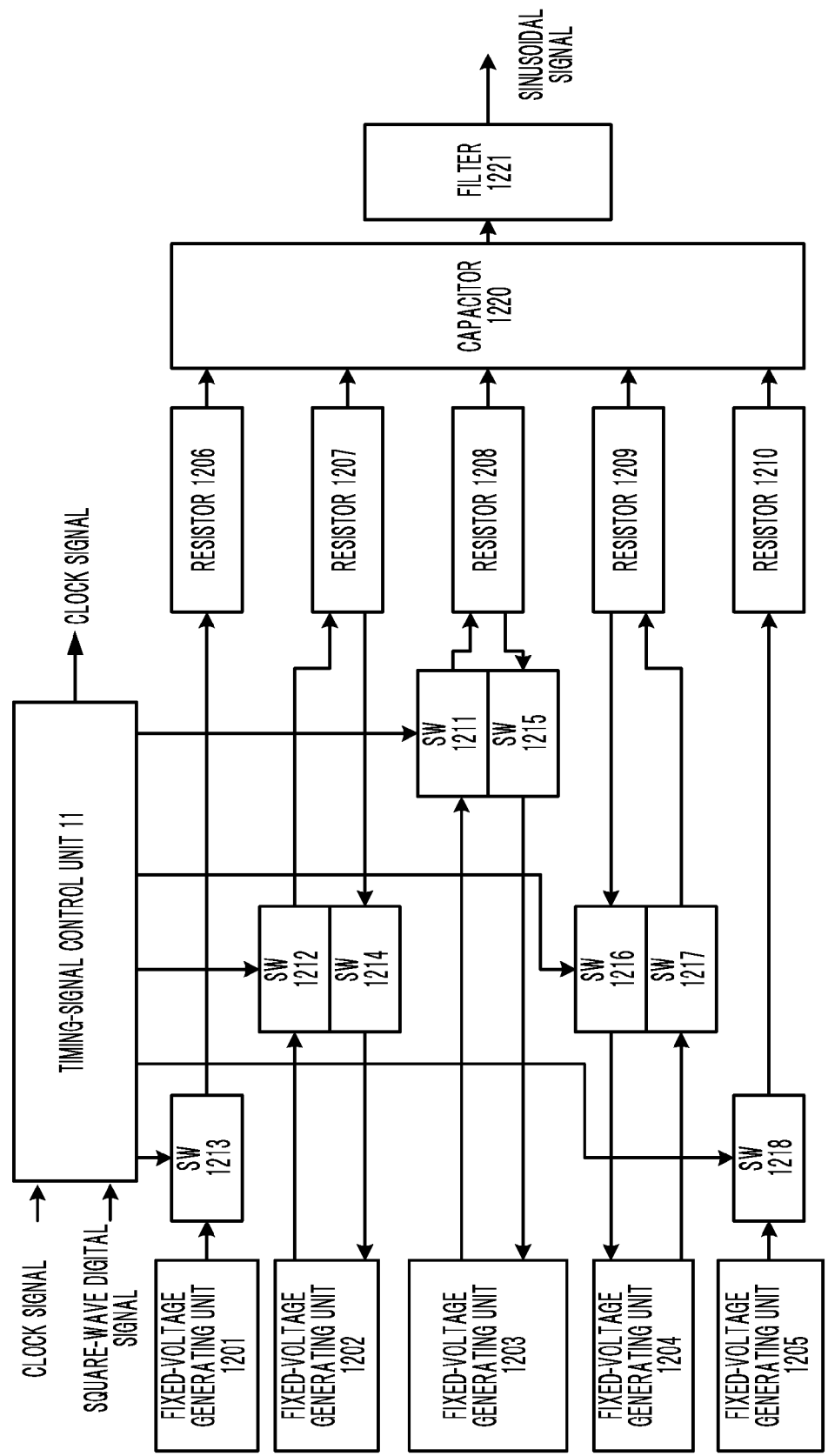
FIG. 6 illustrates an example of a configuration of the sinusoidal-signal generating unit.

FIG. 6 illustrates an example of a configuration of the sinusoidal-signal generating unit 12. The sinusoidal-signal generating unit 12 includes five fixed-voltage generating units 1201, 1202, 1203, 1204, and 1205 that generate voltage values different from one another. According to the example illustrated in FIG. 5, the fixed-voltage generating units 1201, 1202, 1203, 1204, and 1205 are fixed-voltage generators that generate 3.1V, 2.66V, 1.6V, 0.54V, and 0.1V, respectively. Each of the fixed-voltage generating units 1201, 1202, 1203, 1204, and 1205 is, for example, a shunt regulator.

The fixed-voltage generating units 1201, 1202, 1203, 1204, and 1205 are connected via resistors 1206, 1207, 1208, 1209, and 1210, respectively, to a capacitor 1220. Each of the resistors 1206, 1207, 1208, 1209, and 1210 controls the amount of current that is supplied from a corresponding one of the fixed-voltage generating units 1201, 1202, 1203, 1204, and 1205. The amount of change in a voltage across the capacitor 1220 differs for each of the eight equal periods from a corresponding one of the phases, which are determined in units of $\pi/4$, to the next phase. Accordingly, the speed of change in the voltage across the capacitor 1220 is controlled, thereby adjusting the gradient of the waveform of a signal that is output from the capacitor 1220 so that the waveform of the signal will become close to the waveform of the sine wave.

Each of switches 1211, 1212, 1213, 1214, 1215, 1216, 1217 and 1218 is turned on based on a corresponding one of the above-described eight timing signals, and is, for example, a field-effect transistor (FET) switch. Note that each of the switches 1211, 1212, 1213, 1214, 1215, 1216, 1217 and 1218 is turned off when a time corresponding to a phase of $\pi/4$ elapses after it has been turned on. Switching operations using the timing signals are as follows.

(1) The reference timing signal causes the switch 1211 to be turned on before the timing corresponding to the phase of zero (at the timing corresponding to the phase of $-\pi/4$), whereby the fixed-voltage generating unit 1203 is electrically connected to the capacitor 1220. Accordingly, the voltage across the capacitor 1220 is set to 1.6 V by the timing corresponding to the phase of zero.

(2) At the timing corresponding to the phase of zero, the $+\pi/4$ timing signal causes the switch 1212 to be turned on, whereby the fixed-voltage generating unit 1202 is electrically connected to the capacitor 1220. Accordingly, a current flows from the fixed-voltage generating unit 1202 to the capacitor 1220, whereby the voltage across the capacitor 1220 is increased from 1.6 V to 2.66 V by the timing corresponding to the phase of $+\pi/4$. The change in the voltage is output.

(3) At the timing corresponding to the phase of $+\pi/4$, the $+\pi/2$ timing signal causes the switch 1213 to be turned on, whereby the fixed-voltage generating unit 1201 is electrically connected to the capacitor 1220. Accordingly, a current flows from the fixed-voltage generating unit 1201 to the capacitor 1220, whereby the voltage across the capacitor 1220 is increased from 2.66 V to 3.1 V by the timing corresponding to the phase of $-\pi/2$. The change in the voltage is output.

(4) At the timing corresponding to the phase of $-\pi/2$, the $+3\pi/4$ timing signal causes the switch 1214 to be turned on, whereby the fixed-voltage generating unit 1202 is electrically connected to the capacitor 1220 again. Accordingly, a current flows backwards from the capacitor 1220 to the fixed-voltage generating unit 1202, whereby the voltage across the capacitor 1220 is decreased from 3.1 V to 2.66 V by the timing corresponding to the phase of $+3\pi/4$. The change in the voltage is output.

(5) At the timing corresponding to the phase of $+3\pi/4$, the $+\pi$ timing signal causes the switch 1215 to be turned on, whereby the fixed-voltage generating unit 1203 is electrically connected to the capacitor 1220. Accordingly, a current flows from the capacitor 1220 to the fixed-voltage generating unit 1203, whereby the voltage across the capacitor 1220 is decreased from 2.66 V to 1.6 V by the timing corresponding to the phase of $+\pi$. The change in the voltage is output.

(6) At the timing corresponding to the phase of $+\pi$, the $-3\pi/4$ timing signal causes the switch 1216 to be turned on, whereby the fixed-voltage generating unit 1204 is electrically connected to the capacitor 1220. Accordingly, a current flows from the capacitor 1220 to the fixed-voltage generating unit 1204, whereby the voltage across the capacitor 1220 is decreased from 1.6 V to 0.54 V by the timing corresponding to the phase $+5\pi/4$. The change in the voltage is output.

(7) At the timing corresponding to the phase of $+5\pi/4$, the $-\pi/2$ timing signal causes the switch 1217 to be turned on, whereby the fixed-voltage generating unit 1204 is electrically connected to the capacitor 1220. Accordingly, a current flows from the capacitor 1220 to the fixed-voltage generating unit 1204, whereby the voltage across the capacitor 1220 is decreased from 0.54 V to 0.1 V by the timing corresponding to the phase of $+3\pi/2$. The change in the voltage is output.

(8) At the timing corresponding to the phase of $+3\pi/2$, the $-\pi/4$ timing signal causes the switch 1218 to be turned on, whereby the fixed-voltage generating unit 1205 is electrically connected to the capacitor 1220. Accordingly, the direction in which a current flows is reversed, so that a current flows from the fixed-voltage generating unit 1205 to the capacitor 1220, whereby the voltage across the capacitor 1220 is increased from 0.1 V to 0.54 V by the timing corresponding to a phase of $+7\pi/4$. The change in the voltage is output.

(9) Returning to (1) given above, at the timing corresponding to the phase of $+7\pi/4$ (the phase of $-\pi/4$), the reference timing signal causes the switch 1211 to be turned on, whereby the fixed-voltage generating unit 1203 is electrically connected to the capacitor 1220. Accordingly, a current flows from the fixed-voltage generating unit 1203 to the capacitor 1220, whereby the voltage across the capacitor 1220 is increased from 0.54 V to 1.6 V by the timing corresponding to a phase of $+2\pi$ (the phase of zero). The change in the voltage is output. In this manner, the processes of (1) to (8) are repeated, whereby the sinusoidal signal may be generated.

Furthermore, a sinusoidal signal having an opposite phase may be generated by performing the switching operations in an order of (5), (6), (7), (8), (1), (2), (3), and (4).

The timing-signal output unit 111 of the timing-signal control unit 11 performs control of outputting the timing signals so that the sinusoidal signal having a phase which is determined based on the logical value of the square-wave digital signal will be generated. For example, when the logical value is High, the timing-signal output unit 111 outputs the timing signals with which the switching operations are to be performed in the order of (1) to (8), whereby the sinusoidal signal having a phase is generated. When the logical value is Low, in order to generate the sinusoidal signal having a phase that is opposite to the phase of the sinusoidal signal which is generated when the logical value is High, the timing-signal output unit 111 outputs the timing signals with which the switching operations are to be performed in the order of (5), (6), (7), (8), (1), (2), (3), and (4), whereby the sinusoidal signal having the opposite phase is generated.

The waveform of the sinusoidal signal that is output from the capacitor 1220 is not a complete sinusoidal waveform, and the sinusoidal signal includes a high-frequency element. Accordingly, the high-frequency element is removed from the sinusoidal signal by a filter 1221 that is a low-pass filter (LPF), and the sinusoidal signal is output to the transmission path. Furthermore, if necessary, the generated sinusoidal signal is amplified by an amplifier, and output.

When the frequency of the square-wave digital signal that is transmitted is determined, without generating the approximately sinusoidal signal using the above-described configuration, data that concerns the waveform of a sinusoidal signal and that supports the frequency of the square-wave digital signal may be prepared in advance, and the square-wave digital signal may be converted into a sinusoidal signal having a frequency that is the same as the frequency of the square-wave digital signal. However, the signal transmission device according to the present embodiment may generate a sinusoidal signal having any frequency, and may be applied to various frequencies.

In order to support various frequencies, it is preferable that the filter 1221 have a configuration in which the most favorable filter is selected, based on a frequency, from among a plurality of filters having different cutoff characteristics. For example, the filter 1221 may have a configuration in which one of the plurality of filters is selected by a selector. Furthermore, regarding the resistors 1206 to 1210, it is also preferable that a configuration be used, in which the resistors 1206 to 1210 may be adjusted or may be selected so that the most favorable resister value will be obtained based on a frequency.

Figure 7:
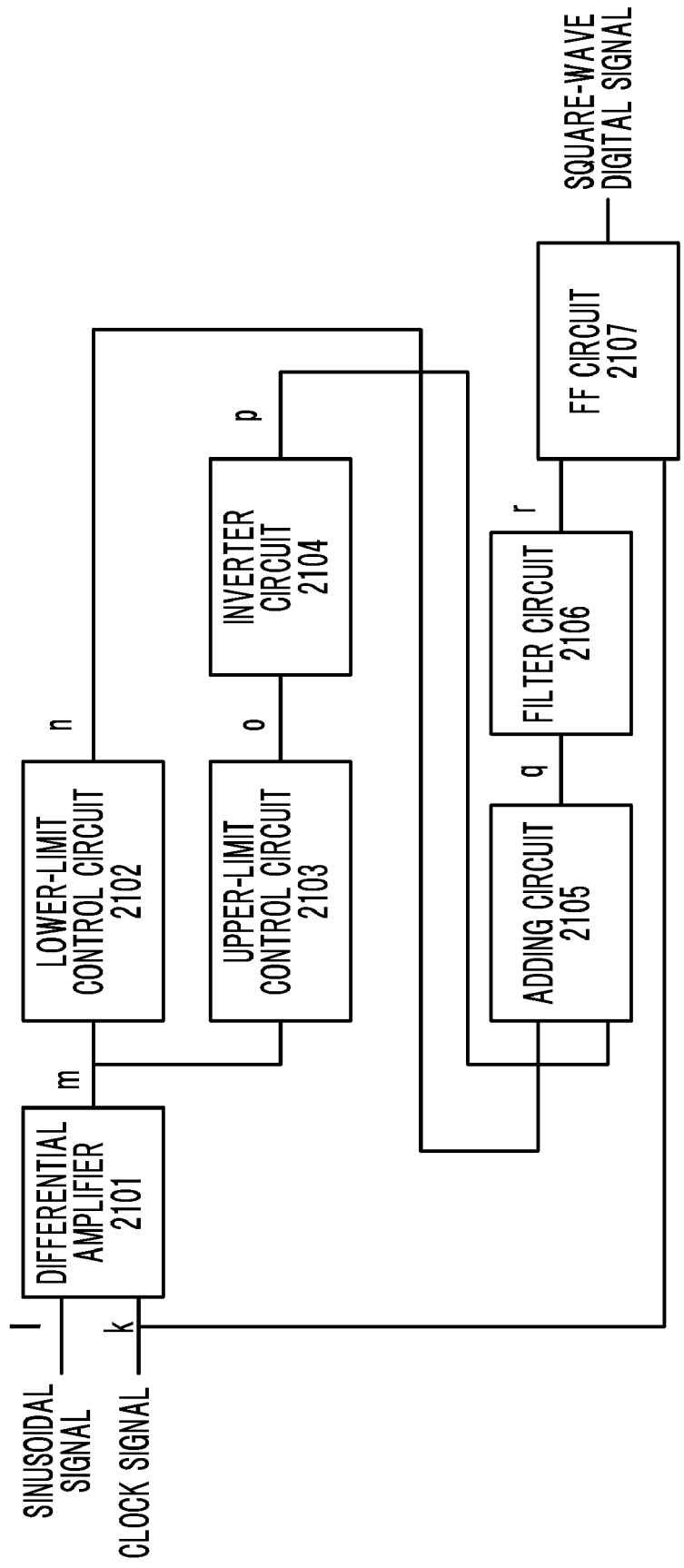
FIG. 7 illustrates an example of a first configuration of a sinusoidal-signal receiving unit.
Figure 8:
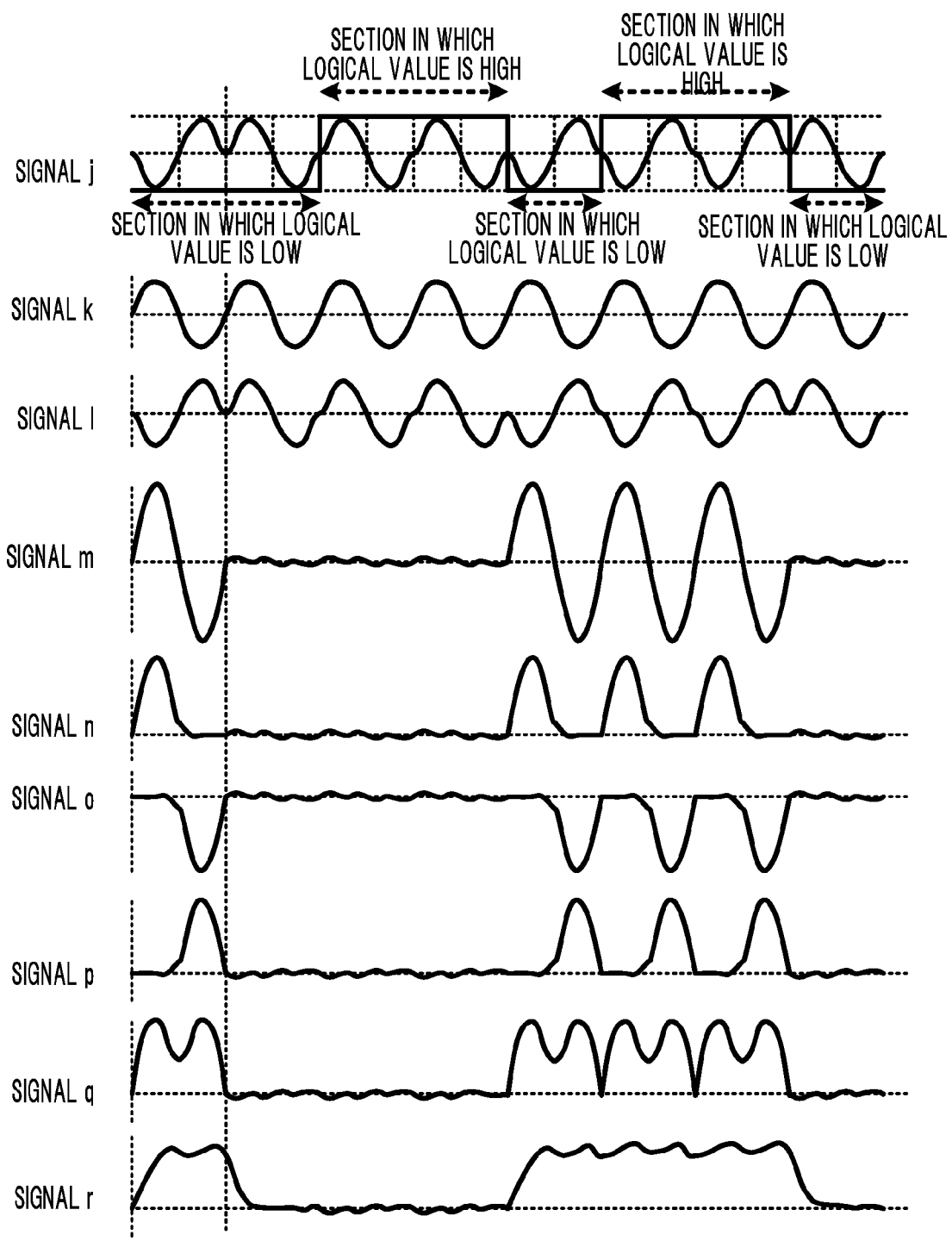
FIG. 8 is a timing diagram of signals in the example of the first configuration of the sinusoidal-signal receiving unit.

FIG. 7 illustrates an example of a first configuration of the conversion unit 21 of the sinusoidal-signal receiving unit 20. Furthermore, FIG. 8 is a timing diagram of signals in the example of the first configuration of the conversion unit 21. In the example of the first configuration, the clock signal is transmitted together with the sinusoidal signal from the sinusoidal-signal transmitting unit 10 side. The clock signal is caused to pass through an LPF in the timing-signal control unit 11 of the sinusoidal-signal transmitting unit 10, whereby the clock signal is subjected to waveform shaping so that the clock signal will have a sinusoidal waveform, and is transmitted (a signal k illustrated in FIG. 8).

The sinusoidal signal (a signal l illustrated in FIG. 8) that has been transmitted from the sinusoidal-signal transmitting unit 10 and the clock signal (the signal k) having a sinusoidal waveform are input to a differential amplifier 2101. The phase of the sinusoidal signal (the signal l) corresponds to a logical value indicated by a signal j illustrated in FIG. 8. Note that the phase of the sinusoidal signal (the signal l) corresponds to a logical value that has been obtained by converting the logical value of the square-wave digital signal (the signal j) using differential logic (see FIG. 1A).

A signal m illustrated in FIG. 8 is a signal that has been output from the differential amplifier 2101. The signal (the signal m) that has been output from the differential amplifier 2101 is divided into an upper half signal (a signal n illustrated in FIG. 8) and a lower half signal (a signal o illustrated in FIG. 8) by a lower-limit control circuit 2102 and an upper-limit control circuit 2103, respectively. The lower half signal (the signal o) is inverted by an inverter circuit 2104 (a signal p illustrated in FIG. 8). An adding circuit 2105 combines the signal (the signal p) that has been output from the inverter circuit 2104 with the signal (the signal n) that has been output from the lower-limit control circuit 2102 (a signal q illustrated in FIG. 8). The signal (the signal q) that has been output from the adding circuit 2105 is caused to pass through a filter circuit 2106, thereby obtaining the waveform of a signal r illustrated in FIG. 8.

Then, the signal (the signal r) that has been output from the filter circuit 2106 and the clock signal (the signal k) are input to a flip-flop (FF) circuit 2107, and conversion is performed to obtain the square-wave digital signal. In a case in which the logical value of the square-wave digital signal is converted using differential logic on the transmission side, the square-wave digital signal subjected to conversion is reconverted using differential logic, whereby the signal j may be obtained.

Figure 9:
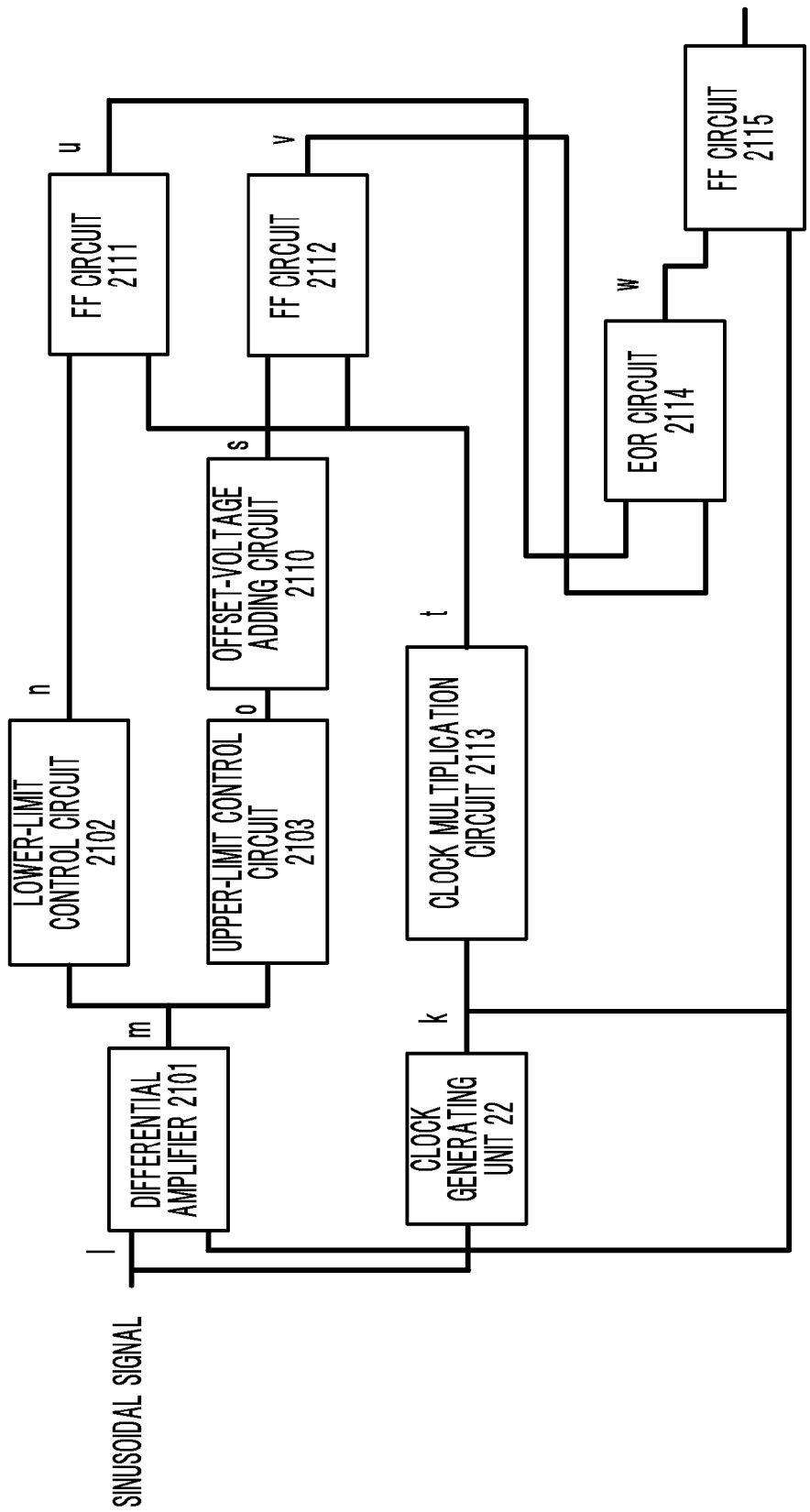
FIG. 9 is an example of a second configuration of the sinusoidal-signal receiving unit.
Figure 10:
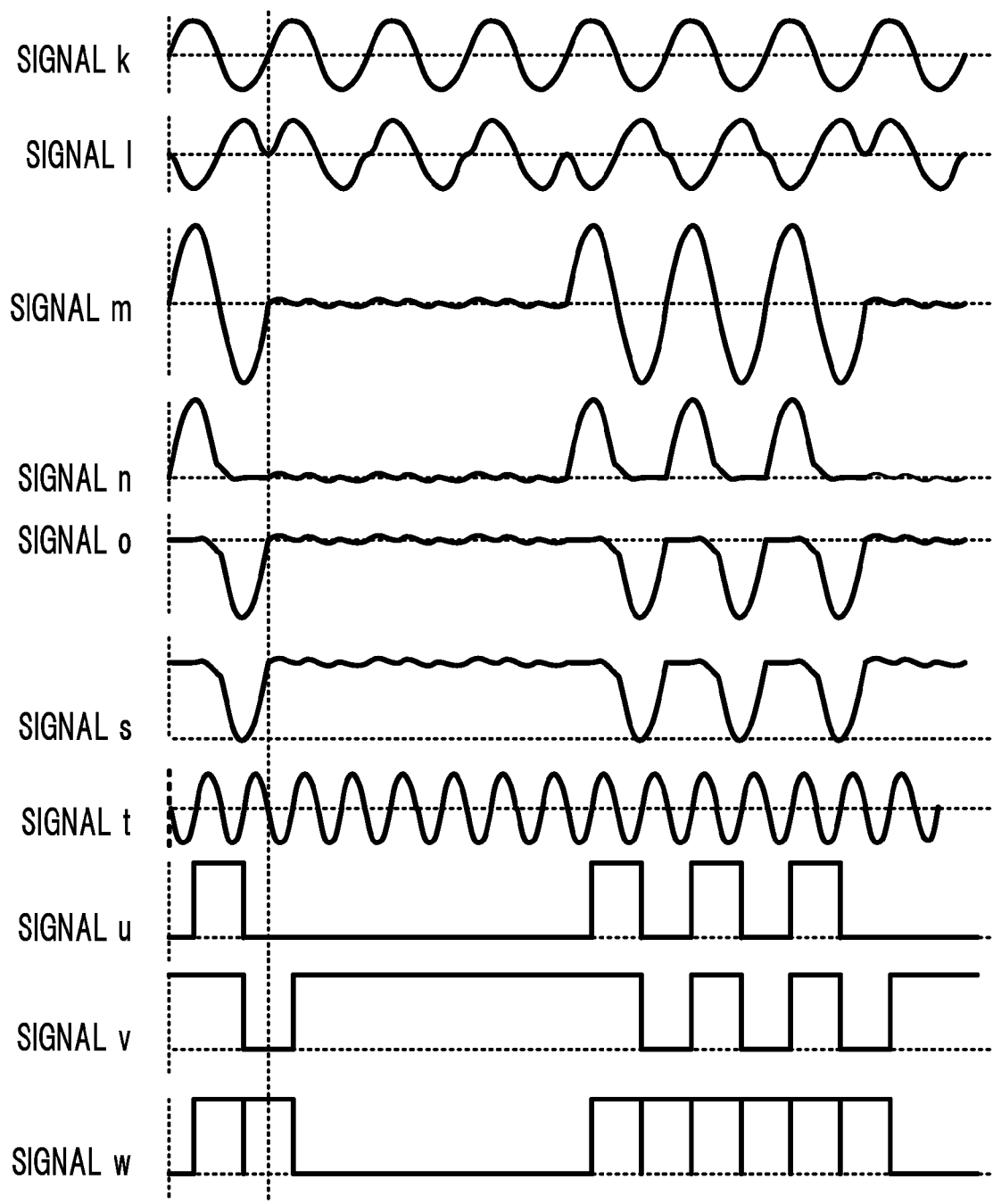
FIG. 10 is a timing diagram of signals in the example of the second configuration of the sinusoidal-signal receiving unit.

FIG. 9 is an example of a second configuration of the conversion unit 21 of the sinusoidal-signal receiving unit 20. Furthermore, FIG. 10 is a timing diagram of signals in the example of the second configuration of the conversion unit 21. In the example of the second configuration, no clock signal is transmitted from the sinusoidal-signal transmitting unit 10 side, and the clock generating unit 22 generates a clock signal from the sinusoidal signal. An example of a configuration of the clock generating unit 22 will be described below with reference to FIG. 11. However, a clock signal is generated by being subjected to waveform shaping so that the clock signal will have a sinusoidal waveform as in the examples illustrated in FIGS. 8 and 9 (the signal k illustrated in FIG. 9).

As in the example of the configuration illustrated in FIG. 8, the sinusoidal signal (the signal l) that has been transmitted from the sinusoidal-signal transmitting unit 10 and the clock signal (the signal k) having a sinusoidal waveform are input to the differential amplifier 2101. The phase of the sinusoidal signal (the signal l) corresponds to the logical value indicated by the signal j illustrated in FIG. 8. Note that the phase of the sinusoidal signal (the signal l) corresponds to the logical value that has been obtained by converting the logical value of the square-wave digital signal (the signal j) using differential logic (see FIG. 1A).

Then, as in the example of the configuration illustrated in FIG. 8, the signal (the signal m) that has been output from the differential amplifier 2101 is divided into an upper half signal (the signal n) and a lower half signal (the signal o) by the lower-limit control circuit 2102 and the upper-limit control circuit 2103, respectively. In the example of the second configuration, a specified voltage level is added to the lower half signal (the signal o) by an offset-voltage adding circuit 2110, thereby adding an offset to the lower half signal (a signal s illustrated in FIG. 9).

The signal (the signal n) that has been output from the differential amplifier 2102 and a clock signal (a signal t illustrated in FIG. 9) whose frequency has been multiplied by two by a clock multiplication circuit 2113 are input to an FF circuit 2111. Furthermore, the signal (the signal s) that has been output from the offset-voltage adding circuit 2110 and the clock signal (the signal t) whose frequency has been multiplied by two are input to an FF circuit 2112. Signals u and v illustrated in FIG. 9 are signals that are output from the FF circuits 2111 and 2112, respectively. Both of the signals (the signals u and v) are input to an EOR circuit 2114. A signal w illustrated in FIG. 9 is a signal that is output from the EOR circuit 2114. The signal (the signal w) that is output from the EOR circuit 2114 corresponds to the signal p or r illustrated in FIG. 8.

Accordingly, the signal (the signal w) that has been output from the EOR circuit 2114 and the clock signal (the signal k) are input to an FF circuit 2115, and conversion is performed to obtain the square-wave digital signal. As in the case illustrated in FIG. 8, in a case in which the logical value of the square-wave digital signal is converted using differential logic on the transmission side, the square-wave digital signal subjected to conversion is reconverted using differential logic, whereby the signal j illustrated in FIG. 8 may be obtained. In a case in which the logical value is not converted using differential logic, conversion using differential logic is unnecessary on the reception side.

Figure 11:
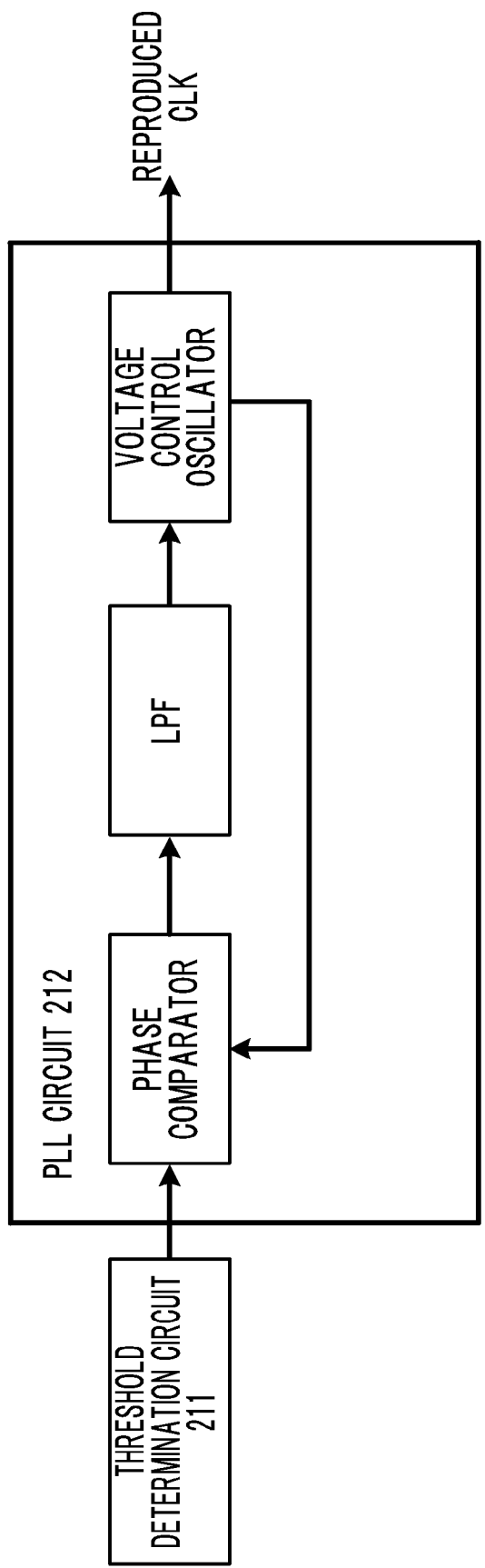
FIG. 11 illustrates an example of a configuration of a clock generating unit.

FIG. 11 illustrates an example of a configuration of the clock generating unit 22. Furthermore, FIGS. 12A to 12C are timing diagrams of signals in the clock generating unit 22. The clock generating unit 22 includes a threshold determination circuit 211 and a phase-locked loop (PLL) circuit 212. Using the center voltage of the sinusoidal signal as a threshold voltage (th), the threshold determination circuit 211 detects a timing at which the voltage of the sinusoidal signal reaches and becomes higher or lower than the threshold voltage. The threshold determination circuit 211 outputs a timing signal indicating the detected timing to the PLL circuit 212. The PLL circuit 212 determines the average of the period of the timing signal, and outputs the timing signal, whereby the PLL circuit 212 may generate a clock signal. Regardless of the phase of the sinusoidal signal, the voltage of the sinusoidal signal reaches and becomes higher or lower the center voltage once in one period. Accordingly, a clock signal that is synchronized with the sinusoidal signal may be generated by supplying the timing to the PLL circuit 212.

FIG. 12A illustrates the sinusoidal signal corresponding to the square-wave digital signal. FIG. 12B illustrates, in a case in which the center voltage is considered as the threshold voltage (th), the timing at which the voltage of the sinusoidal signal changes and becomes higher or lower the threshold voltage. FIG. 12C illustrates the clock signal that is output from the PLL circuit 212.

In the example of the second configuration (illustrated in FIG. 9) of the conversion unit 21 of the sinusoidal-signal receiving unit 20, the clock generating unit 22 reproduces the clock signal from the sinusoidal signal. Accordingly, a signal line on which the clock signal is transmitted from the transmission side may be removed. In the example of the first configuration (illustrated in FIG. 7), in a case in which the clock signal is not transmitted, the clock generating unit 22 reproduces the clock signal. In the example of the second configuration (illustrated in FIG. 9), in a case in which the clock signal is transmitted, the clock generating unit 22 does not necessarily need to be provided.

In the present embodiment, occurrence of unnecessary high-frequency signals may be reduced using the basic waveform of a sine wave, and physical degradation caused by cross talk between wiring patterns may be reduced.

In the above-described example, a sinusoidal signal is generated using the voltage levels that are generated for the discrete eight phases. However, the number of voltage levels that are prepared for generation of a sinusoidal signal is not limited to eight. In transmission between boards or transmission in a board, standards for emission of out-of-band signals are not strict, compared with those in radio communication. Accordingly, high-frequency signals that do not cause degradation are acceptable to some degree. Thus, the number of voltage levels that are prepared for generation of a sinusoidal signal may be appropriately determined based on the degree of complication of a circuit configuration, the degree of acceptance of occurrence of high-frequency signals, and so forth.

Furthermore, because a modulation function such as a modulation function used in radio communication is not desired, high-speed transmission may be realized using a simple circuit configuration.

In the present embodiment, occurrence of high-frequency signals is reduced, and a signal attenuation only around the frequency of a transmission signal is reduced so that the signal attenuation is equal to or lower than a value which is desired to transmit the transmission signal. Thus, high-speed transmission of data may be realized using the frequency of the transmission signal without reducing the amount of the data (without adding a redundancy signal). Even in transmission conditions in which a range indicating frequency characteristics is narrow so that the range extends only to a frequency as low as a transmission frequency, stable transmission may be realized without being influenced by high-frequency signals.

Regarding termination, in a case of transmission using a square wave signal, direct current (DC) coupling, i.e., a direct current element, is desired. However, in the present embodiment, transmission using alternating current (AC) coupling may be realized. Regarding termination at a reception terminal, termination using a register that desires a wideband is not used, and AC termination may be realized, whereby a direct current may be reduced. Furthermore, reflection at the reception terminal may be reduced, and degradation caused by intersymbol interference between signals may be reduced.

In the above-described embodiment, an example is described, in which binary values (H/L) of a digital signal are transmitted as phase information items. However, transmission using multiple values, the number of multiple values being larger than that of binary values, may be realized based on a phase detection accuracy by detecting a correlation between a reference phase and the phase of the digital signal using a correlation detector.

The above-described embodiment may be applied to a signal transmission device for transmitting a signal in a board or between boards implemented in an electronic apparatus such as a radio base station apparatus in a radio communication system.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal transmission device for transmitting a signal along a transmission path, the signal transmission device comprising:
    a sinusoidal-signal transmitting unit configured to generate a sinusoidal signal that has a same period as a period of a square-wave digital signal, whose voltage level changes in correspondence with a logical value, and that has a phase that differs based on a change in a logical value of the square-wave digital signal, and configured to transmit the sinusoidal signal; and
    a sinusoidal-signal receiving unit configured to receive the sinusoidal signal, and configured to reproduce the square-wave digital signal from the sinusoidal signal based on a change in the phase of the sinusoidal signal.

2. The signal transmission device according to claim 1, wherein the sinusoidal-signal transmitting unit generates a plurality of timing signals for dividing, using phase differences that are determined at specified intervals, the period of the square-wave digital signal, and generates a plurality of voltage levels of a sine wave, each of the plurality of timing signals corresponding to one of a plurality of phases, each of the phases corresponding to one of the plurality of voltage levels, thereby generating the sinusoidal signal.

3. The signal transmission device according to claim 2, wherein the sinusoidal-signal transmitting unit controls, based on the logical value of the square-wave digital signal, timings at which the plurality of timing signals are output, and generates the sinusoidal signal having a phase that differs based on a change in the logical value of the square-wave digital signal.

4. The signal transmission device according to claim 2, wherein the sinusoidal-signal transmitting unit includes:
    a plurality of voltage generating units configured to generate the plurality of voltage levels of the sine wave; and
    a plurality of switches that allow, at the timing at which each of the plurality of timing signals is output, a corresponding one of the plurality of voltage generating units to output a voltage.

5. The signal transmission device according to claim 1, wherein the sinusoidal-signal receiving unit reproduces the square-wave digital signal based on a detected phase difference between the sinusoidal signal and a clock signal.

6. The signal transmission device according to claim 1, wherein the sinusoidal-signal transmitting unit transmits a clock signal together with the sinusoidal signal to the sinusoidal-signal receiving unit.

7. The signal transmission device according to claim 1,
    wherein the sinusoidal-signal transmitting unit transmits only the sinusoidal signal to the sinusoidal-signal receiving unit without transmitting a clock signal, and
    wherein the sinusoidal-signal receiving unit includes a clock generating unit configured to generate a clock signal from the received sinusoidal signal.

8. The signal transmission device according to claim 7, wherein the clock generating unit detects a timing at which a level of the sinusoidal signal reaches and becomes higher or lower than a specified threshold, determines an average of a period of a timing signal indicating the detected timing, and outputs the timing signal.

9. A signal transmission method for transmitting a signal along a transmission path, the signal transmission method comprising:
    generating a sinusoidal signal that has a same period as a period of a square-wave digital signal, whose voltage level changes in correspondence with a logical value, and that has a phase that differs based on a change in a logical value of the square-wave digital signal, and transmitting the sinusoidal signal; and
    receiving the sinusoidal signal, and reproducing the square-wave digital signal from the sinusoidal signal based on a change in the phase of the sinusoidal signal.

10. A signal transmission device for outputting a signal to a transmission path, the signal transmission device comprising:
    a timing-signal generating unit configured to generate a plurality of timing signals for dividing, using phase differences that are determined at specified intervals, a period of a square-wave digital signal whose voltage level changes in correspondence with a logical value; and a sinusoidal-signal generating unit configured to generate, based on the plurality of timing signals, a sinusoidal signal that has a period the same as the period of the square-wave digital signal and that has a phase that differs based on a change in the logical value of the square-wave digital signal.

11. The signal transmission device according to claim 10, further comprising a filter configured to receive the sinusoidal signal generated by the sinusoidal-signal generating unit and remove a high-frequency element from the sinusoidal signal.

* * * * *